United States Patent Office 3,091,627
Patented May 28, 1963

3,091,627
PREPARATION OF ALCOHOLS
Bernard Rudner, Pittsburgh, Pa., assignor to Koppers Company, Inc., a corporation of Delaware
No Drawing. Filed Aug. 15, 1960, Ser. No. 49,416
7 Claims. (Cl. 260—462)

This invention relates to the preparation of alcohols from organo-aluminum or boron compounds. In one specific aspect, it relates to the preparation of primary and secondary alcohols by the reaction of an oxacarbocyclic with an organo aluminum or organo boron compound and the hydrolysis of the resulting ester of aluminum or boron. In another aspect, it relates to the preparation of alcohols from oxiranes or oxetanes and organo aluminum or organo boron compounds.

The reaction of organo aluminum compounds with oxacarbocyclics is not new. Kambara et al, J. Polymer Science, 27, 584 (58), reported the reaction of triethyl aluminum with excess propylene oxide to give a polymeric product. The polymerization of oxiranes using a small amount of an organo-aluminum compound, such as an aluminum alkyl, is known from the teachings of Stuart et al, British Patent 785,229, and Hudy, U.S. 2,895,924. Similar work was reported by Price et al, J. Polymer Science, 34, 157–165 (1959). Price and his associates catalyzed the polymerization of ethylene oxide, propylene oxide and phenyl glycidyl ether by heating the oxirane in the presence of 0.058–1.00 mole of triethyl aluminum, triisobutyl aluminum or diethyl aluminum chloride for 2–35 days. Price offered a lengthy proof that the products thus obtained were polymers and not alcohols.

Quite surprisingly, I have discovered that, under carefully controlled conditions, useful higher alcohols can be made using oxacarbocyclic compounds, such as oxiranes or oxetanes, and organo aluminum or organo boron compounds as starting materials. My new method offers a unique and economical route to a vast number of the commercially desirable higher alcohols.

It is therefore an object of the present invention to provide a new and economical method of alcohol manufacture.

In accordance with the invention, alcohols are made by reacting in an inert atmosphere and in the presence of an inert solvent substantially stoichiometric quantities of an oxacarbocyclic having from 2–57 carbon atoms and up to 3 oxygen containing rings, each ring having only one oxygen atom and from 2–3 carbon atoms, said oxacarbocyclic being free of other reducible groups and free of active hydrogen atoms, with a compound of the formula $R_3M$, wherein R is a hydrocarbon residue selected from the group consisting of alkyl radicals of from 1–40 carbon atoms, aryl, aralkyl and cycloalkyl, and M is a member selected from the group consisting of boron and aluminum. The oxacarbocyclic and the organo aluminum or boron compound react to form an ester, which is then hydrolyzed to an alcohol having at least 2 carbon atoms more than the number of carbon atoms of an individual R substituent of the organo aluminum or boron compound. Depending on the particular reactants used and the reaction conditions chosen, the product alcohol is a primary alcohol, a secondary alcohol, an ether-alcohol, or mixtures of these alcohols.

The general reaction upon which the method of the invention is based is shown below in Equation 1:

(1)
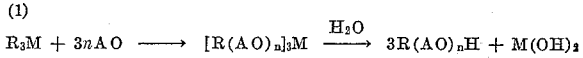

In the above equation, R and M have the values given aforesaid, A is the alkyl, cycloalkyl, cycloalkylalkyl or aralkyl residue of an oxirane or oxetane and $n$ has a value of 1–2.

Oxacarbocyclics useful in the invention include those compounds having 2–57 carbon atoms and containing from 1–3 oxirane or oxetane rings. It is of utmost importance that the compounds do not contain substituents reducible by $R_3Al$ or $R_3B$ under the conditions used, such as nitro, cyano, aldehydo, oximino and the like or active hydrogen atoms, such as those which form part of hydroxyl, enol, carboxyl, reactive methylene, or primary amino groups.

Thus, suitable oxacarbocyclics are those wherein the oxirane or oxetane rings are attached only to members selected from the group consisting of hydrogen, hydrocarbon, ether and ester radicals.

Many of the useful oxacarbocyclics are commercially available and the others are made by standard procedures, such as the dehydrohalogenation of 1,2- and 1,3-halohydrins; detosylation of 2- and 3-hydroxyalkyl sulfonates; dehydration of 1,2- and 1,3-glycols and pyrolysis of cyclic glycol carbonates. The commercially available ethylene oxide and propylene oxide are made by the catalytic oxidation of ethylene and propylene, respectively. The more complex monoepoxies are made by the reaction of a "per" acid, such as peracetic acid, with an olefin. Diepoxides are sometimes made in this way, although they also are prepared by a one or two step reaction from epichlorohydrin by dehydrochlorination.

Useful oxiranes and oxetanes thus include ethylene oxide, 2,3-butylene oxide, 1,2,3,4-diepoxybutane, vinylcyclohexane mono- and diepoxides, spiro-di-oxetane, epichlorohydrin, 2,2-diphenyloxetane, 2,3,4-triphenyloxetane, 3-chlorophenyglycidyl ether, epoxypropyl epoxystearate, oxetanylmethyl epoxystearate, glyceryl tri (epoxystearate), orcinol diglycidyl ether, resorcinol diglycidyl ether, hexatriene dioxide and the like.

The more sterically hindered oxacarbocyclic compounds react slowly even at higher temperatures. In such cases, there is a greater tendency for the formation of simple alcohols (wherein $n$ equals 1) rather than ether alcohols (wherein $n$ equals 2).

The organo aluminum or boron compounds useful in the invention can be obtained in commercial quantities or, alternatively, they can be made by well-known methods. For example, long chain aluminum alkyls can be made by the route devised by Dr. Karl Ziegler, which involves reacting ethylene with aluminum and hydrogen to form triethyl aluminum and reacting this with additional ethylene to form a trialkyl aluminum having long alkyl chains. The corresponding boron compounds can be made by reacting the product with a boron trihalide. Certain useful organo aluminum or boron compounds can be prepared by metathesis; for example, aluminum naphthaleneide is prepared by the reaction of aluminum chloride with sodium naphthaleneide.

The compound $R_3M$ can be formed in situ by using its adducts with certain organic or inorganic salts; i.e. $RM'$ and $M'X$, wherein R has the value given aforesaid, and M' is an alkali or alkaline earth metal and X is a halogen, cyanide or acetate. The use of such adducts according to the method of the invention is shown below in Equations 2 and 3:

(2)
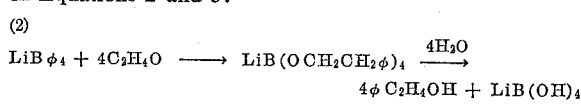

(3)
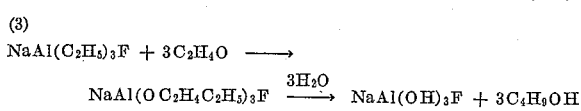

Adducts such as $R_4MM'$, e.g. $NaAl(C_2H_5)_4$ or $(C_4H_9)_5AlCa$, are made by heating RM' with $R_3M$ in a suitable solvent such as diglyme or toluene.

It is advisable to use an organo aluminum or boron compound having at least 3 carbon to metal bonds; if compounds which have less than 3 carbon to metal bonds, e.g. phenylboronic acid, ethyl aluminum dichloride, diisobutyl aluminum hydride, diethyl ethylboronate, are used mixed products are obtained and more oxacarbocyclic is required to make the desired quantity of alcohol as is illustrated by Equations 4 and 5.

(4)

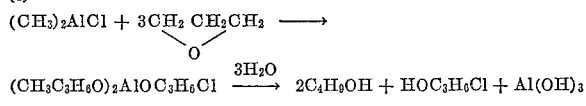

$$(CH_3C_3H_6O)_2AlOC_3H_6Cl \xrightarrow{3H_2O} 2C_4H_9OH + HOC_3H_6Cl + Al(OH)_3$$

(5)

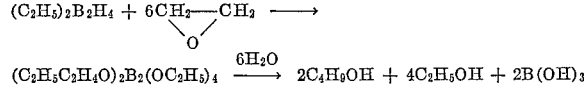

$$(C_2H_5C_2H_4O)_2B_2(OC_2H_5)_4 \xrightarrow{6H_2O} 2C_4H_9OH + 4C_2H_5OH + 2B(OH)_3$$

It is also preferable to use a symmetrically substituted organo aluminum or boron compound to avoid the separation problems incurred as a result of the formation of mixed products.

It is essential that the reaction mixture, during the reaction of the organo aluminum or boron compound and the oxacarbocyclic, be substantially free of oxygen, water, and active hydrogen compounds. This is conveniently accomplished by using substantially anhydrous reactants and blanketing the reaction mixture with an inert gas, such as nitrogen, argon, helium and the like.

In order to obtain the alcohols by the method of the invention, it is necessary to use substantially stoichiometric quantities of the organo aluminum or boron compound and the oxacarbocyclic. If a large excess of the oxacarbocyclic is present, the organo aluminum or boron compound serves only to catalyze the polymerization of the oxacarbocyclic, as has been convincinly demonstrated by the work of Price et al., supra. A slight excess of the organo aluminum or boron compound is sometimes helpful in avoiding the formation of ether alcohols if the simple alcohols are preferred as products. However, a slight excess of oxacarbocycle serves to convert the more expensive aluminum or boron compound more completely. No great advantage is seen in using a considerable excess of organo aluminum or boron since such usage is obviously wasteful. It is convenient, and therefore preferable, to add the oxacarbocycle to the other reactant. This order of addition also helps to prevent the polymerization of the oxacarbocyclic, since excess organo aluminum or boron compound is present at all times.

The reaction is conducted in the presence of an anhydrous inert organic solvent. By the term "inert" I mean a solvent which will not oxidize, hydrolyze or reduce either of the reactants. Such solvents include saturated aliphatic hydrocarbons, e.g. heptane, hexane, decane and the like; cycloaliphatic hydrocarbons, e.g. cyclohexane, methylcyclohexane, decalin and the like; aromatic hydrocarbons, e.g. benzene, xylene, toluene and the like; cyclic and acyclic ethers, e.g. tetrahydrofuran, diethyl ether and diglyme; azaaromatics, e.g. pyridine; saturated tertiary amines, e.g., N-methylmorpholine, tri-amylamine, etc. and aryl chlorides, e.g. chlorobenzene, dichlorobenzene and the like.

Tertiary amines, ethers and sulfides, being Lewis bases, do react with the aluminum or boron compounds, which are Lewis acids. The reaction products, being adducts, do not destroy reactivity. Surprisingly, I have discovered that if the solvent selected is more basic (in the Lewis sense of electron pair donors) than the oxacarbocyclic used in the reaction, the resulting product is predominantly a secondary alcohol rather than a primary alcohol. This phenomenon is graphically illustrated by Equations 6 and 7 shown below:

(6)

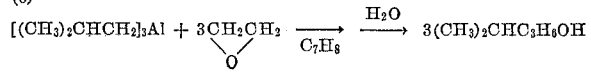

(7)

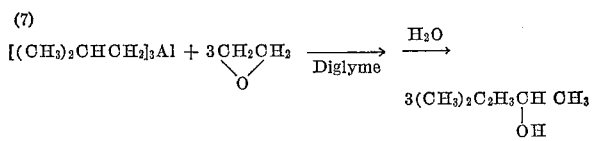

$$3(CH_3)_2C_2H_3CH\ OH_3$$
$$\qquad\qquad\qquad\quad |$$
$$\qquad\qquad\qquad\ OH$$

Since the Lewis base solvents such as diglyme, tetrahydrofuran, and tertiary amines affect the course of the reaction without being consumed therein, they can still be considered to be inert solvents.

The reaction is conducted at a temperature ranging between about −10° C. to about 150° C. Below about −10° C. the reaction proceeds very slowly and the cost of refrigerating the reaction mixture is excessive. Above about 150° C., there is danger of decomposing the reactants and products. Temperatures in the higher portion of the range are most suitable for reacting the more sterically hindered oxacarbocyclics with the organo aluminum or boron compounds. If an organo boron compound is used as a reactant, it is also desirable to use higher temperatures, since the organo boron compounds are less reactive than the organo aluminum compounds. If an organo aluminum compound is used, the reaction is markedly exothermic and begins at temperatures of about 15–20° C. In this case, in order to keep the reaction under control it is necessary to keep the initial reaction temperature below about 40° C. At reaction temperatures in the higher portion of the range, side reactions are more likely to occur.

Suitable reaction pressures range from atmospheric pressure to about 1,500 p.s.i.g. From the standpoint of cost, it is preferable to use atmospheric pressures, since no particular advantage is obtained by using higher or lower pressures, except where it is necessary to promote reaction between the more sterically hindered reactants.

The reaction is continued until the reactant that is present in the least amount is completely consumed. Generally speaking, for the simpler reactants, 4 hours' reaction time at room temperature is sufficient to insure complete reaction. With the more sterically hindered oxacarbocyclic and less reactive organo aluminum or boron compound, complete reaction takes up to 24 hours at temperatures of 125–150° C. It is preferable to use the shortest reaction time possible under the conditions selected to avoid polymer formation. The extent of reaction can be measured at intervals by conventional laboratory techniques, e.g. by oxirane titration or aluminum alkyl hydrolysis.

As I have noted, the reaction between the oxcarbocyclic and the organo aluminum or boron compound results in the formation of an ester. Hydrolysis of the ester gives the product alcohol. The choice of conditions of hydrolysis is dictated to a large extent by the nature of the product. For example, the reaction products from $R_3Al$ are easier to hydroylze than those obtained from $R_3B$, but in the presence of unconsumed $R_3Al$ the hydrolysis must be conducted with greater caution. Ideally, the mixture containing the ester is poured slowly over ice and stirred until there are no more carbon to aluminum or oxygen to aluminum bonds. If the product alcohol is volatile, it is distilled off. If it is involatile, it is recovered by extraction. If the product is involatile and water soluble, the hydrolyzed mxture is saturated with a salt, such as potassium carbonate or sodium sulfate, before extraction. Frequently, it is best to strip off some or all of the solvent before hydrolysis. This is especially true if the product alcohol is to be recovered by steam distillation or if the reaction solvent is a poor solvent for the alcohol.

Using either steam distillation or solvent extraction, it is best to limit the amount of water added for hydrolysis to 2–10 times the amount needed according to theory:

(8) $\qquad (RO)_3M + 3H_2O \rightarrow 3ROH + M(OH)_3$

The hydrolysis of the aluminum alcoholate in water gives alumina as a precipitate, which is undesirable if the alcohol is not one which can be recovered by steam stripping. In this case, it is desirable to solubilize the alumina by using at least stoichiometric quantities of a strong mineral acid (sulfuric acid and phosphoric acid are preferred, but hydrochloric acid is acceptable if either is not used to extract the alcohol from the reaction mixture) or a base such as sodium hydroxide, ammonium hydroxide or mixtures of ammonium hydroxide and ammonium chloride.

In the case of the more sterically hindered ester or in the case of those containing boron rather than aluminum, more rigorous conditions of hydrolysis are required. In such cases, hydrolysis can be accomplished by heating the ester in the presence of a mineral acid or metal hydroxide at the reflux temperature of the reaction mixture. Alternatively, the ester, particularly one containing boron, can be transesterified with a simple alcohol. If transesterification is used, 5–20 times the theoretical amount of a lower alkanol, e.g. methyl alcohol or ethyl alcohol, is added and the resulting mixture is distilled slowly through a column until the alcohol-alkyl borate azeotrope no longer comes over. The mixture is then refluxed for a short period of time and the procedure is repeated until the initial portion of the distillate is free of boron containing compounds. After the lower alkanol or its azeotrope with an alkyl borate is distilled off, the product alcohol remains as a residue.

I have thus provided a new and economical method of making alcohols from organo ester compounds. In contrast with the "Alfol" process developed by Dr. Ziegler, involving the oxidation of an aluminum alkyl and subsequent hydrolysis of the alkyl alcoholate, my new method is more versatile in that it can give as products alcohols having at least 2 additional carbon atoms and the ether-alcohols, which are sold commercially as "Cellosolves." Higher yields of the commercially useful fatty alcohols are obtainable using my method. Moreover, by my new method, if a Lewis base solvent is used as a reaction medium, I am able to make predominantly secondary alcohols, an accomplishment which is not possible by the Ziegler "Alfol" process. My process is also more flexible, since the same product can be made from different starting materials, e.g. n-hexanol can be made from tributyl aluminum and ethylene oxide or tripropyl aluminum and oxetane.

My invention is further illustrated by the following examples:

EXAMPLE I

Preparation of Butanol

A 500 ml. three-necked round bottomed flask, equipped with a gas inlet tube, stirrer, thermometer well, and cold-finger reflux condenser leading to a Dry Ice-chilled gas trap and then to a liquid nitrogen-cooled trap, was thoroughly dried and purged with dry nitrogen. The flask was then charged under an atmosphere of nitrogen with 174 g. pure heptane and 87.8 g. triethyl aluminum. The flask was immersed in a cooling bath at −20 to 0° C. and 114 g. (10% in excess of the stoichiometric amount) ethylene oxide was added thereto over a period of about 4 hours. The heat evolved during the exothermic reaction caused the temperature to rise to 14–16° C. There was no unreacted ethylene oxide present in the Dry Ice-cooled trap. The next morning, there was no unconsumed ethylene oxide above the reaction mixture, but a test sample, quantitatively hydrolyzed, showed that approximately ⅓ of the carbon to aluminum bonds were unreacted. During the removal of the heptane by a distillation, a quantity of dioxane equivalent to about ⅓ of the ethylene oxide reactant was collected in the pot. The highly water-reactive ester was divided into aliquots and the various aliquots were hydrolyzed as follows:

A portion rediluted with roughly 4 times its weight of pure heptane was hydrolyzed at 10° C. with approximately an equal weight of water. The temperature of the mixture rose to and stayed at 5° C. above the bath temperature. 99% pure heptane evolved as a gas. The hydrolysis mixture was filtered free of the aluminum hydroxide and thereafter distilled. The first cut was a butyl alcohol-heptane azeotrope boiling at 94° C., containing 19.3% by weight butyl alcohol as a 36:1 mixture of normal butyl alcohol and secondary butyl alcohol. From the forerun and higher cuts, there was obtained additional normal butyl alcohol; the pot residue, 7.6 g., was crude butoxyethanol, boiling at 98° C. The filtration residue, pumped to constant weight, gave as a condensate in a Dry Ice-cooled trap 34.2 g. of 60% pure n-butyl alcohol and a small quantity of butoxyethanol. Analysis of the dry alumina residue showed that it retained tenaciously an appreciable quantity of alcohol. On the basis of carbon to aluminum bonds consumed the yield of butyl alcohol was about 73% of the theoretical and that of butoxyethanol about 8% of theory.

A 66 g. quantity of metalate in 97 ml. pure diethyl cyclohexane was placed in a fluted flask equipped with a high speed agitator and hydrolyzed by the dropwise addition of 105% of the theoretical amount of water. The hydrolysis mixture was filtered to remove the aluminum hydroxide and the filtrate was distilled to give as a first cut a 2 layer liquid containing a total of 11.1 g. butyl alcohol, 23% of the theoretical. A second cut of pure normal butyl alcohol raised this yield slightly. Although the residue of aluminum hydroxide was found to contain an appreciable quantity of alcohols, these could not be removed by extraction with ether.

A small portion of the ester was treated with an excess of sulfuric acid at a 1:1 dilution with water at 20° C. The product was then steam distilled and the distillate saturated with cold potassium carbonate to give an upper layer representing approximately 50% of the theoretical yield of butyl alcohol and 6% of theory of butoxyethanol, as determined by infrared analysis.

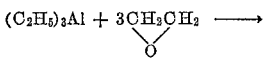

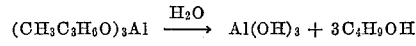

EXAMPLE II

Preparation of Hexanol

A 56.3 g. quantity of triisobutyl aluminum in 325 g. of pure peroxide-free diethyl ether was treated over a period of 100 minutes with 39.5 g. of ethylene oxide. The reaction mixture was allowed to come to room temperature slowly. The exothermic reaction started at 17° C. and resulted in eventual temperature rise to 32° C. After removal of the solvent, the mixture was hydrolyzed and steam-stripped to give approximately a 70° conversion, based on the ethylene oxide consumed, of 4-methylpentanol-1 and 4-methylpentanol-2 (in about a 3:1 ratio), and a mixture of ethylene glycol ethers.

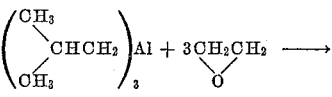

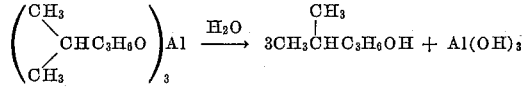

EXAMPLE III

Preparation of Butanol

A 60 g. quantitly of triethyl aluminum in 314 g. of dry pure pyridine was treated at about 0° C. over a period of about 2 hours with 70 g. of ethylene oxide. During this time the very pale yellow triethyl aluminum solution gradually turned to a dark red. In contrast with the earlier runs where no Lewis base solvent was used, the air-free Dry Ice-chilled trap contained only a negligible amount of ethylene oxide. The stripping off of the solvent gave a clear deep red viscous syrup in which essentially all of the carbon to aluminum bonds had been converted to carbon to oxygen to aluminum bonds. Hydrolysis resulted in the formation of a mixture of butanol-1 and butanol-2, the latter compound being formed in the predominant amount.

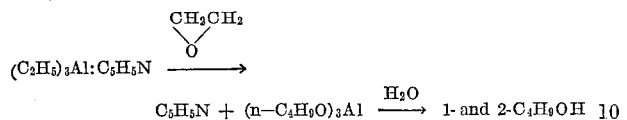

EXAMPLE IV

Preparation of Butanol 1,2-bis-(2-methoxyethoxy)ethane, commercially available as "triglyme," was dried and deperoxidized over $CaH_2$ and distilled under nitrogen to give a center cut boiling at 109° C. at 14.5 mm. of Hg. An 80 g. quantity of triethyl aluminum in 296 g. triglyme was treated over a period of 3¼ hours with 102.4 g. (about a 5% excess of the stoichiometric requirement) ethylene oxide at a temperature of about 20–25° C. The color of the reaction mixture turned to a pale yellow. There was no unabsorbed ethylene oxide present in the reaction mixture, but gases containing 5.9% by weight ethylene oxide and 0.3% by weight dioxane were evolved during hydrolysis. The metalate formed during the reaction was hydrolyzed with dilute sulfuric acid and thereafter distilled to give 97.3 g. of mixed dioxane, butanol-2 and butanone-2, representing a 50% yield of the mixed butanol-2 and butanone-2 based on the weight of ethylene oxide consumed. There was no butanol-1 or butoxyethanol present in the product mixture. The butanone was believed formed by the self-catalyzed oxidation of $Al(OR)_3$.

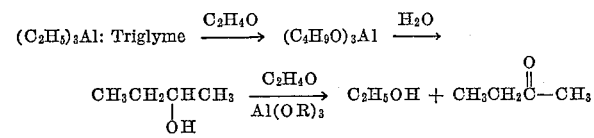

EXAMPLE V

Preparation of n-Hexadecanol

Commercial grade 1-tetradecene was distilled to give a cut boiling at 106–107° C. at 5.8 mm. of Hg. A 257 g. quantity of this cut was added to 77.7 g. triisobutyl aluminum (80% triisobutyl aluminum, 20% diisobutyl aluminum hydride) in a nitrogen atmosphere at 88–124° C. over a period of 7 hours. The reaction mixture was kept at reflux until no more $C_4$ hydrocarbons were caught in the trap; approximately one-half of the theoretical amount of $C_4$ hydrocarbons having been evolved according to the equation:

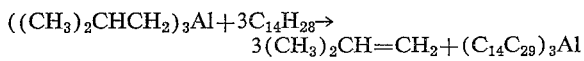

To the mixture was added, under a nitrogen atmosphere, 145.9 g. pure dry toluene. Over a period of about 2 hours, 97.1 g. ethylene oxide was added thereto at a temperature of 10–35° C. and the reaction mixture was stirred overnight. The metalate thus formed was hydrolyzed by the dropwise addition of 209.3 g. of concentrated hydrochloric acid added over a 1 hour period at a temperature of 20–33° C. The mixture was then heated to boiling in one hour, stirred to room temperature and held thereat for 18 hours. The organic and aqueous layers were separated. From the dried organic layer there was obtained 142.5 g. of toluene by distillation. The distillation residue was chille dovernight and filtered through a chilled funnel to give as a solid 10 g. crude cetyl alcohol and as a filtrate 207.7 g. crude cetyl alcohol mixed with tetradecene and toluene. The total yield of cetyl alcohol, based on the isobutylene collected, was 50% of theory.

EXAMPLE VI

Preparation of Phenylbutanol

To 49 g. triethylborane in 215 g. toluene there was added, at a temperature of 25–26° C., 184 g. of styrene oxide in 125 ml. of toluene. The mixture was allowed to stand overnight; it was refluxed for 2 hours and then stirred at room temperature. The toluene and unreacted styrene oxide were stripped off. At room temperature there was added the stoichiometric amount of sodium hydroxide as a 20% aqueous solution over a period of about an hour. The reaction mixture was allowed to settle overnight and the organic layer was separated therefrom. It was washed to neutral with 10 small portions of water and then dried over anhydrous magnesium sulfate. The unreacted toluene and triethyl borane were distilled off at 21° C./20.2 mm. to 24° C./18 mm. of Hg. A second cut, 95.4 g., was obtained at 57° C./4.6 mm. and 27.7 g. of heel remained. Analysis showed the heel to be a mixture of phenylbutanols and their borates, chiefly 2-phenyl-1-butanol and its borate. The second cut was largely styrene oxide and unreacted triethyl borane. Both alkaline and acid hydrolysis of the heel proved less effective in the formation of alcohol than transesterification. Approximately 4 g. of heel were refluxed in 40 ml. of methanol for 16 hours, taken forward slowly through a small helix column until no more methanol-trimethylborate azeotrope was obtained. The remaining portion was refluxed for one hour, and taken forward again. The procedure was repeated and the third distillate gave no signs of azeotrope and did not burn with a green flame. Stripping off methanol gave 2-phenylbutanol-1, containing about 5–10% of its weight of an alcohol, which by infrared analysis was indicated to be 1-phenylbutanol-1.

EXAMPLE VII

Preparation of Ethylcyclohexanol

To 389 g. toluene under dry nitrogen there was added 80 g. dry potassium chloride. The mixture was stirred at 30–35° C., and over a period of 25 minutes there was added 108.9 triethyl aluminum. The resulting mixture was stirred rapidly while heating to reflux over a period of an hour. The mixture was allowed to sit at room temperature overnight which resulted in the formation of a uniform suspension of $(C_2H_5)_3Al.KCl$. (See Annalen 629, 33 (1960).) With rapid stirring, the suspension was treated over a two hour period with 285.3 g. of cyclohexene oxide at room temperature (a cooling bath was used to offset the effect of the exothermic reaction). The resulting mixture was stirred for 2 hours and allowed to stand overnight to give a clear, colorless upper phase and a gelatinous, white lower phase. By analysis the mixture contained some unreacted carbon to aluminum bonds. The mixture was then refluxed for 7 hours, allowed to stand and ⅓ of the toluene was stripped off. The mixture was then hydrolyzed at room temperature with 300 ml. of 30% ammonium chloride solution. The upper organic layer was separated and dried. It was shown by vapor phase chromatography and infrared analysis, to contain approximately a 30:1 mixture of 2-ethylcyclohexanol and 1-ethylcyclohexanol.

EXAMPLE VIII

Preparation of Phenylethanol

A 3.4 g. quantity of sodium tetraphenyl borate was suspended in 30 ml. of refluxing xylene. Through the suspension there was bubbled 1.8 g. ethylene oxide over a 2 hour period. The reaction mixture was stirred for 2 additional hours at reflux, then stirred to room temperature and allowed to stand overnight. The resulting suspension was treated with 30 ml. of concentrated hydrochloric acid, refluxed for 2 hours, cooled and thereafter separated. The organic layer was stripped of solvent and 100 ml. methanol and 5 drops concentrated sulfuric acid were added thereto.

The methanoltrimethyl borate azeotrope was removed as described in Example VI, but without the use of the nitrogen atmosphere. After the removal of the last of the borate, methyl alcohol was stripped from the residue. The residue was taken up in diethyl ether, washed first with water, then with 1% aqueous sodium hydroxide and dried over anhydrous magnesium sulfate. The dry residue was distilled to give 2.0 g. of crude 2-phenylethanol, approximately 85% pure.

EXAMPLE IX

*Preparation of 2-(Dihydronaphthyl-1-)Propanol-2*

100 ml. of a solution sodium naphthaleneide from 11.5 g. sodium and 64 g. naphthalene in 675 ml. tetrahydrofuran) was added at −40° C. to a solution of 2.94 g. anhydrous aluminum chloride in 100 ml. tetrahydrofuran. The theoretical amount of propylene oxide was then added and after being stirred overnight, the mixture was cautiously treated with 5 ml. of methyl alcohol and then steam distilled to remove all of the tetrahydrofuran. The residue was cooled, treated with ammonium hydroxide-ammonium chloride until all of the aluminum oxide appeared to dissolved. The solution was cooled and extracted with benzene repeatedly. The dried extracts were evaporated to give a mixture of naphthylolefin and a mixture of alcohols, the major component of which appeared to be

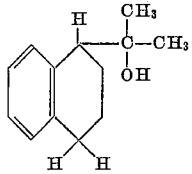

EXAMPLE X

*Preparation of Mixed Fatty Alkanols*

A mixture of aluminum alkyls was prepared according to the method of British Patent 808,055 (Example II) to give, before oxidation, a mixture of 3 mole percent tributyl aluminum, 19% trihexyl aluminum, 30% trioctyl aluminum, 21% tridecyl aluminum, 7% tridodecyl aluminum, and 20% trialkyl aluminum, wherein the alkyl chain contained from 14–40 carbon atoms. 10 g. of this material in 100 ml. of heptane was transferred to a three-necked flask and treated dropwise with the commercially available n-octyloxirane, 25 g., at 35–45° C. over a period of 2 houss. The mixture was allowed to stand overnight. It was then heated to 80° C. and 15 ml. of isopropyl alcohol was added dropwise thereto with stirring. The resulting mixture was the steam distilled to give homologous $C_8$, $C_{10}$, $C_{12}$ and $C_{14}$ alcohols in the distillate, along with solvent and isopropyl alcohol. The upper layer of cooled residue, after treatment with ammonium chloride-ammonium hydroxide to dissolve the aluminum oxide, was separated, washed with 5% ammonium hydroxide and then with water and dried over anhydrous magnesium sulfate. Distillation of the dried material gave a mixture of $C_{14}$-$C_{20}$ alcohols as a distillate; the heel contained homologous higher alcohols. These materials are directly convertible, even before hydrolysis, to anionic detergents and plasticizers.

EXAMPLE XI

*Preparation of Phenylated Fatty Alcohols*

A dry vial was charged with a suspension of 0.3 g. mixed tolyl aluminum compounds (para- and ortho-isomers predominating) in 3 ml. dry cyclohexane in a dry box and capped under nitrogen with a tight fitting rubber cap. Very slowly there was injected by hypodermic needle through the cap 2.6 g. commercially available fully epoxidized soy bean oil and the mixture was allowed to stand. The exothermic reaction was controlled using a cold water bath. The mixture was allowed to stand for 24 hours at 40° C., during which time gel formation occurred. There was then added 10 ml. concentrated hydrochloric acid and 10 g. of ice with stirring. The temperature was raised to 40° C. and the upper layer was separated, washed with HCl and water, dried and stripped of solvent. Infrared analysis of the residue confirmed the formation of a glyceride containing tolyl and hydroxy groups.

EXAMPLE XII

*Preparation of Benzylated Fatty Alcohols*

The method of Example XI was repeated using an equal weight of crude benzyl aluminum, a pyrophoric tan powder. Infrared analysis showed that reaction occurred and that benzyl rather than tolyl compounds formed as a thick oil.

EXAMPLE XIII

*Preparation of Resorcinol Ether*

7.6 g. of resorcinol diglycidyl ether in 100 ml. of stirred chlorobenzene at 100° C. was added dropwise over 2 hours a solution of 2 g. triethyl borane in 50 ml. of chlorobenzene. The mixture was refluxed for 6 hours with stirring to give a thick gel. At approximately 80° C., there was added 50 ml. ethyl alcohol and the resulting mixture was refluxed for 2 hours, then distilled to a vapor temperature of 120° C. Additional ethyl alcohol was added and the distillation was repeated until there was no more boron compounds in the distillate. The solvent was stripped off to give a brown, oily, water-insoluble residue, indicating the formation of phenylene-bis-(hydroxyamyl-ether).

EXAMPLE XIV

*Preparation of Hexanol*

A mixture of 2.6 g. 3,3-dimethyloxetane and 0.6 g. trimethylborane in 10 ml. of heptane was refluxed for 8 hours, then stripped of solvent in vacuo. By distillation with methanol as in Example VI there was obtained as a residue 2.6 g. crude primary alcohol, the spectra and reactions of which indicated it to be 2,2-dimethylbutanol.

I claim:

1. Method of making alcohols comprising reacting in an inert atmosphere substantially stoichiometric quantities of an oxacarbocyclic having 2 to 57 carbon atoms and up to 3 oxygen-containing rings, each ring having only one oxygen atom and from 2 to 3 carbon atoms, said oxygen-containing rings being attached only to members selected from the group consisting of hydrogen, hydrocarbon, ether and ester radicals, with a compound of the formula $R_3B$, wherein R is a member selected from the group consisting of alkyl radicals of from 1 to 40 carbon atoms, aryl, aralkyl and cycloalkyl, to form a borate, hydrolyzing said borate, and recovering from the reaction mixture an alcohol having at least two carbon atoms more than the number of carbon atoms of an individual R substituent of said $R_3B$.

2. Method of making alcohols comprising reacting in an inert atmosphere and in the presence of a Lewis base selected from the group consisting of pyridine and 1,2-bis-(2-methoxyethoxy)ethane substantially stoichiometric quantities of an oxacarbocyclic having 2 to 57 carbon atoms and 1 to 3 oxygen-containing rings, each ring having only one oxygen atom and from 2 to 3 carbon atoms, said oxygen-containing rings being attached only to members selected from the group consisting of hydrogen, hydrocarbon, ether and ester radicals, with a compound of the formula $R_3M$, wherein R is a member selected from the group consisting of alkyl radicals of from 1 to 40 carbon atoms, aryl, aralkyl and cycloalkyl, and M is a member selected from the group consisting of boron and aluminum, to form an ester of M, hydrolyzing said ester, and recovering from the reaction mixture a secondary alcohol having at least two carbon atoms more than the number of carbon atoms of an individual R substituent of said $R_3M$.

3. Method according to claim 2 wherein the reaction temperature is −10 to 150° C.

4. Method of making alcohols comprising reacting in an inert atmosphere and in the presence of an inert solvent substantially stoichiometric quantities of ethylene oxide and an organo boron compound of the formula $R_3B$, wherein R is an alkyl radical having from 1 to 40 carbon atoms, to form a borate, hydrolyzing said borate and recovering from the reaction mixture an alcohol having at least two carbon atoms more than the number of carbon atoms of an individual R substituent of said organo boron compound.

5. Method of making alcohols comprising reacting in an inert atmosphere and in the presence of an inert organic solvent substantially stoichiometric quantities of a diepoxide having only one oxygen atom and from 2–3 carbon atoms in the oxygen-containing rings, said diepoxide having up to 57 carbon atoms and said oxygen-containing rings being attached only to members selected from the group consisting of hydrogen, hydrocarbon, ether and ester radicals, and an organo boron compound of the formula $R_3B$, wherein R is an alkyl radical of from 1–40 carbon atoms, to form a borate, hydrolyzing said borate and recovering from the reaction mixture an alcohol having at least 2 carbon atoms more than the number of carbon atoms of an individual R substituent of said organo boron compound.

6. Method of making borates comprising reacting in an inert atmosphere and in the presence of an inert organic solvent substantially stoichiometric quantities of an oxacarbocyclic having up to 57 carbon atoms and up to 3 oxygen-containing rings, each ring having only one oxygen atom and from 2 to 3 carbon atoms, said oxygen containing rings being attached only to members selected from the group consisting of hydrogen, hydrocarbon, ether and ester radicals, and a compound of the formula $R_3B$, wherein R is a member selected from the group consisting of alkyl radicals of from 1 to 40 carbon atoms, aryl, aralkyl and cycloalkyl, to form a borate and recovering said borate from the reaction mixture.

7. Method of making borates comprising reacting in an inert atmosphere and in the presence of an inert organic solvent substantially stoichiometric quantities of styrene oxide and a compound of the formula $R_3B$, wherein R is an alkyl radical of from 1–40 carbon atoms, to form a borate, and recovering said borate from the reaction mixture.

References Cited in the file of this patent

UNITED STATES PATENTS 3,024,287     Kennedy et al. _____ Mar. 6, 1962

OTHER REFERENCES

The Van Nostrand Chemist's Dictionary, D. Van Nostrand Company, Inc., New York, 1953, page 94.